US009082454B2

(12) United States Patent
Yao et al.

(10) Patent No.: US 9,082,454 B2

(45) Date of Patent: Jul. 14, 2015

(54) AUTOMATICALLY REMOVING CONTAMINANTS FROM A MANUFACTURED PART

(75) Inventors: Yi Zhao Yao, Singapore (SG); Sai H. Wong, Singapore (SG); Meng K. Leong, Singapore (SG); Siew W. Sum, Singapore (SG)

(73) Assignee: HGST Netherlands B.V., Amsterdam (NL)

( * ) Notice: Subject to any disclaimer, the term of this patent is extended or adjusted under 35 U.S.C. 154(b) by 2071 days.

(21) Appl. No.: 11/636,122

(22) Filed: Dec. 8, 2006

(65) Prior Publication Data

US 2008/0135065 A1 Jun. 12, 2008

(51) Int. Cl.

| | |
|---|---|
| ***B08B 3/00*** | (2006.01) |
| ***G11B 25/04*** | (2006.01) |
| ***B08B 3/02*** | (2006.01) |
| ***B08B 11/00*** | (2006.01) |
| ***B25J 9/16*** | (2006.01) |
| ***B25J 15/04*** | (2006.01) |

(52) U.S. Cl.

CPC ................ *G11B 25/043* (2013.01); *B08B 3/02* (2013.01); *B08B 11/00* (2013.01); *B25J 9/1682* (2013.01); *B25J 15/0475* (2013.01)

(58) Field of Classification Search

None

See application file for complete search history.

(56) References Cited

U.S. PATENT DOCUMENTS

| | | | | |
|---|---|---|---|---|
| 4,823,279 | A * | 4/1989 | Perzley et al. | 700/251 |
| 4,974,210 | A * | 11/1990 | Lee | 700/260 |
| 2002/0096436 | A1* | 7/2002 | Olgado et al. | 205/220 |
| 2002/0179737 | A1* | 12/2002 | Ryser | 239/418 |
| 2005/0051198 | A1* | 3/2005 | Laski | 134/34 |

FOREIGN PATENT DOCUMENTS

BE 899829 A1 * 10/1984

OTHER PUBLICATIONS

Derwent English abstract for BE899829.*

EPO machine translation of BE 899829 to Staar Development.*

* cited by examiner

*Primary Examiner* — Eric Golightly

(57) ABSTRACT

Embodiments of the present invention pertain to automatically removing contaminants from a manufactured part. According to one embodiment, a first robotic arm automatically holds the manufactured part. A second arm automatically sprays the manufactured part with a solution that causes contaminants to be removed from the manufactured part. The solution is collected. The collected solution contains the contaminants that were removed from the manufactured part.

13 Claims, 11 Drawing Sheets

AUTOMATICALLY REMOVING CONTAMINANTS FROM A MANUFACTURED PART

TECHNICAL FIELD

Embodiments of the present invention relate to manufacturing. More specifically, embodiments of the present invention relate to automatically removing contaminants from manufactured parts.

BACKGROUND

Manufacturing disk drives is a very competitive business. People that buy disk drives are demanding more and more for their money. For example, they want disk drives that are more reliable and have more capabilities. One way to provide more capabilities is to make the various disk drive parts smaller.

Contaminants in disk drives can cause damage to the disk drives. The possibility of contaminants causing damage increases as the disk drive parts are made smaller and smaller. Further, the reliability of disk drives can be improved by increasing the cleanliness of the process used for manufacturing the disk drive parts regardless of the disk drive part's size. Therefore, it is important to evaluate the cleanliness of the manufacturing process so that corrective measures can be taken if the cleanliness deteriorates but also as a way of evaluating whether changes to improving the cleanliness of the manufacturing process are working.

SUMMARY OF THE INVENTION

Embodiments of the present invention pertain to automatically removing contaminants from a manufactured part. According to one embodiment, a first robotic arm automatically holds the manufactured part. A second arm automatically sprays the manufactured part with a solution that causes contaminants to be removed from the manufactured part. The solution is collected. The collected solution contains the contaminants that were removed from the manufactured part.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 1:
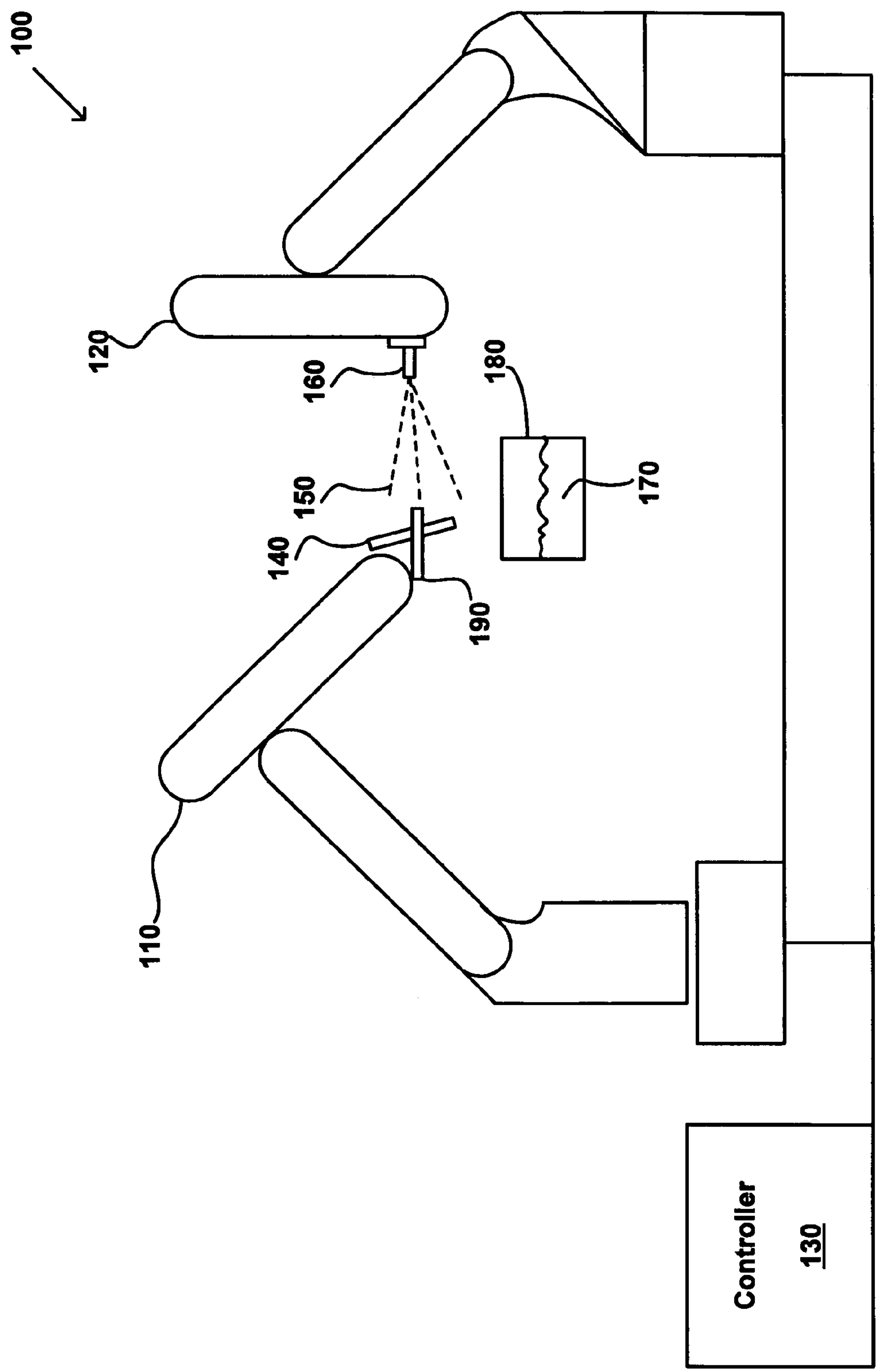
FIG. 1 depicts a side view of a system for automatically removing contaminants from a manufactured part, according to one embodiment.

According to one embodiment, contaminants are automatically removed from a part that has been manufactured. The removed contaminants are analyzed in order to evaluate the cleanliness of the process used to manufacture the part. FIG. 1 depicts a side view of a system 100 for automatically removing contaminants from a manufactured part, according to one embodiment. The system 100 includes two robotic arms 110 and 120, a collection component 180, and a controller 130. According to one embodiment, a first robotic arm 110 includes a gripper 190 for gripping a manufactured part 140 and the second robotic arm 120 includes a spray nozzle 160 for spraying the manufactured part 140 with a solution 150 that causes contaminants to be removed from the manufactured part 140. The solution 170, which contains the removed contaminants, can be collected, for example, in the collection component 180. The collected solution 170 can be analyzed to determine the number or type of contaminants that were removed from the part 140. According to one embodiment, the controller 130 is a computer that executes a program that controls the robotic arms 110 and 120, among other things.

Using a manual system where a human operator holds and sprays a manufactured part with solution results in a significant amount of variability in how contaminants are removed from the manufactured part. For example, a human operator will perform the process of holding, spraying, and so on differently each time. Further, different human operators will perform the process of holding, spraying, and so on differently from each other and may even interpret the instructions for how to hold and spray differently from each other. Variations in how contaminants are removed affect the results, which impacts the ability to compare results.

According to one embodiment, the process of removing contaminants from a manufactured part is automated in order to eliminate the variability of holding, spraying, etc. introduced by a human operator. Therefore, an automated system as depicted in FIG. 1, reduces the variability of how contaminants are collected and can reduce the amount of time to collect solution containing contaminants. Further, using an automated system is easy to use, can be used for many different types of parts, and is easy to program and modify.

System for Automatically Removing Contaminants from a Manufactured Part

Figure 2:
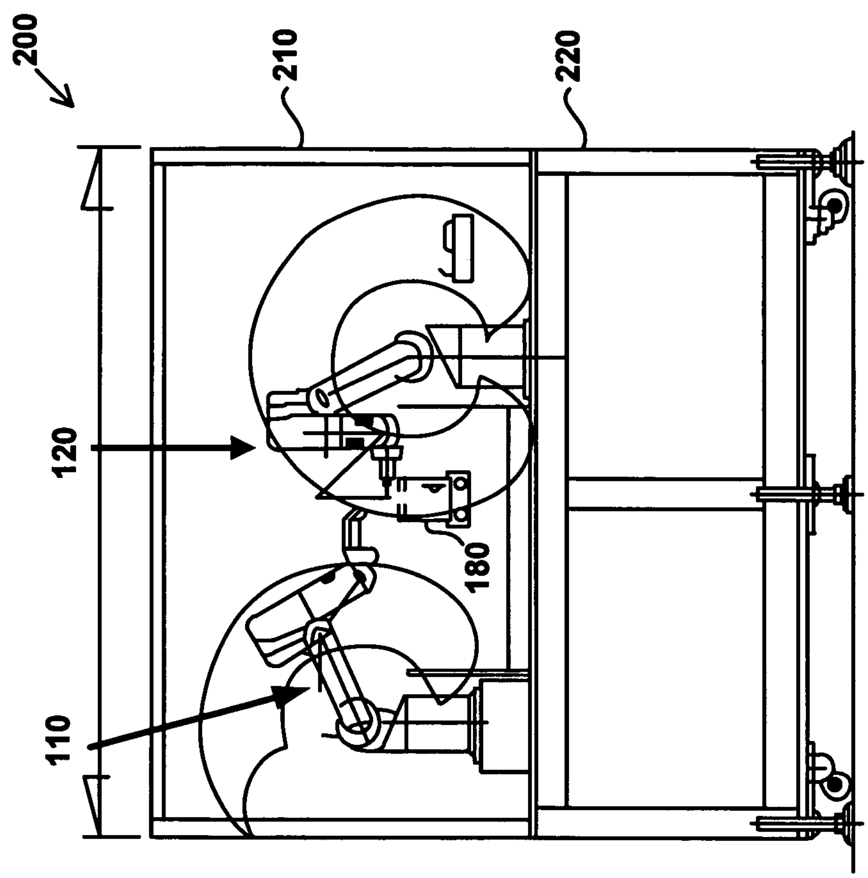
FIG. 2 depicts a more detailed side view of a system 200 for automatically removing contaminants from a manufactured part, according to one embodiment.
Figure 3:
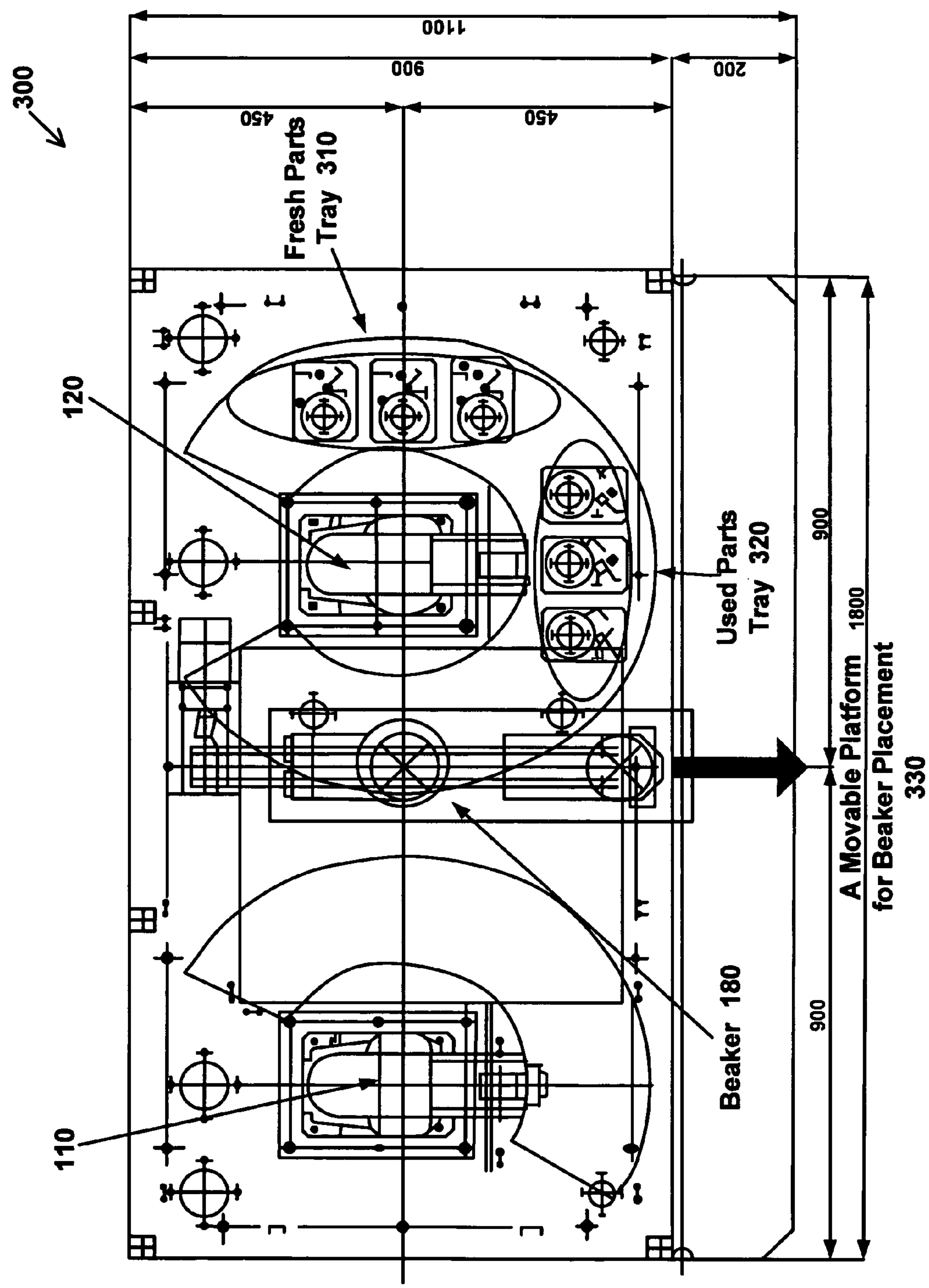
FIG. 3 is a detailed top view 300 of the system 200 depicted in FIG. 2, according to one embodiment.

FIG. 2 depicts a detailed side view of a system 200 for automatically removing contaminants from a manufactured part, according to one embodiment. FIG. 3 is a detailed top view 300 of the system 200 depicted in FIG. 2, according to one embodiment. As depicted in FIGS. 2 and 3, the two robotic arms 110 and 120 and the collection component 180, among other things, are enclosed, for example, by a plastic enclosure 210. The system 200 can also include a controller 130 for controlling the two robotic arms 110, 120. One of the robotic arms 120 is used for spraying a manufactured part 140 that is being held by the other robotic arm 110. The robotic arms 110 and 120 can be moved and rotated in various ways along x, y, and z axis, as will become more evident. According to one embodiment, the robotic arms 110, 120 are mounted on a stainless steel plate bench 220.

The system 200 can also include various other components such as a pressurized vessel, a spray nozzle, master gauges, one or more user interfaces, and various trays 310 and 320. The spray nozzle 160 can be attached to one of the robotic arms 120. The pressurized vessel can be used to contain solution 150 that the spray nozzle 160 sprays onto a manufactured part 140 that the other robotic arm holds 110. The various trays 310, 320 can be used for holding parts before (referred to hereinafter as "fresh part tray") and after (referred to hereinafter as "used part tray") contaminants have been collected. A computer program executing on a controller 130, such as a lap top, can be used to control the system 200's operations. Clean room standards, according to one embodiment, are used for maintaining the cleanliness of the system 200 depicted in FIGS. 2 and 3.

One of the robotic arms 110, 120 positions a collecting component 180, such as a clean beaker, for collecting solution 170 that has been sprayed onto a manufactured part 140 in the "spray zone." FIG. 3 depicts the beaker 180 in the spray zone, according to one embodiment. The second robotic arm 120 can be used to clean the gripper 190 on the first robotic arm 110 by spraying the gripper 190 to avoid cross contamination (also referred to herein as "gripper cleaning cycle"). The first robotic arm 110 picks up a part 140, which has not been sprayed yet, from the fresh parts tray 310 and positions the manufactured part 140 over the clean beaker 180 in the spray zone. The second robotic arm 120 sprays 150 the manufactured part 140 that the first robotic arm 110 is holding to remove loose surface contaminants (also referred to herein as "spray extraction cycle"). The solution that has been sprayed onto the manufactured part is collected 170 in the clean beaker 180. The collected solution 170 includes the loose surface contaminants that were removed by the spraying of the solution 150 onto the manufactured part 140. The beaker 180 with the collected solution 170 is moved and the manufactured part 140 that was sprayed is placed on the used part tray 320. Then the process is repeated with a new clean beaker and the next manufactured part.

Manufactured Part

A manufactured part 140 can be any disk drive component or disk drive subassembly. For example, a manufactured part may be a head stack assembly (HSA) or a disk pack. Although many of the examples described herein refer to the manufactured part being an HSA or a disk pack, various embodiments of the present invention are not limited to disk drive parts and subassemblies but can be used for any type of manufactured part for any type of product.

Robotic Arms

According to one embodiment, the robotic arms 110 and 120 have 6 degrees of freedom. For example, they 110, 120 can move in the + or − direction along the x, y, and z axis. The robotic arms 110, 120 can use 3 joint movements for gripping and holding a manufactured part 140. The robotic arms 110, 120 can move 270 degrees in any direction in a 1 meter (m) radius. According to one embodiment, master gauges are used to ensure the position of the robotic arms 110, 120. The robotic arms 110, 120, according to one embodiment, have acceleration and deceleration functions for high speed movement. The exposure of electrical and pneumatic systems associated with a system 100, 200 is minimized and the joints of the robotic arms 110, 120 are corrosion resistant. The holding robotic arm 110 may lift up to approximately 1.5 kilograms (kg) of weight and the spraying robotic arm 120 may lift up to approximately 1 kgs of weight.

The robotic arms 110, 120 may weigh approximately 20 kgs each. According to one embodiment, a box for controlling the robotic arms 110, 120 is below each robotic arm 110, 120. According to another embodiment, a system 100, 200 for automatically removing contaminants can include a teaching box for teaching the robotic arms 110, 120 the coordinates they 110, 120 should use for various operations. For example, the teaching box can be used to manually move the arms 110, 120, which cause the positions the arms 110, 120 are placed in to be programmed into the system 100, 200. According to one embodiment, the robotic arm is a MITSUBISHI™ RV-1AC-SB.

According to one embodiment, the robotic arms 110, 120 are used to hold and spray a manufactured part 140 in a specific and repeatable manner. The holding robotic arm 110, according to one embodiment, uses grippers to hold onto manufactured parts 140. The robotic arms 110, 120 can include different types of end effectors attached with short quick changes of finger grippers (also referred to as just "grippers.")

Grippers

The grippers 190, according to one embodiment, are designed to hold different types of parts and also designed for quick and easy installation and removing to reduce setup time between spraying different parts. For example, the grippers can use a positive, nimble, self-centering grasp that is adapted to the type of part they are used to hold. A gripper can be used to grip a particular type of part the same way. For example, the gripper can hold the first HSA the same way that it holds a second, third or fifth HSA.

The grippers can include non-metal or rubber studs for gripping the manufactured parts. The grippers apply a force that is strong enough to hold a manufactured part so that the manufactured part does not slip. According to one embodiment, the grippers use sufficient force to compensate for the solution containing a detergent, which would increase the potential of the manufactured part to slip. The gripper system, according to one embodiment, is designed to take into account the mass of the manufactured part as well as the acceleration imposed by the robotic arms as they move.

Different types of grippers can be used for handling different types of parts, for example using screws to attach the grippers to the robotic arms. The studs, according to one embodiment, provide sufficient friction to gently but firming pick up a manufactured part while at the same time not scratching or damaging the manufactured part.

Figure 4:
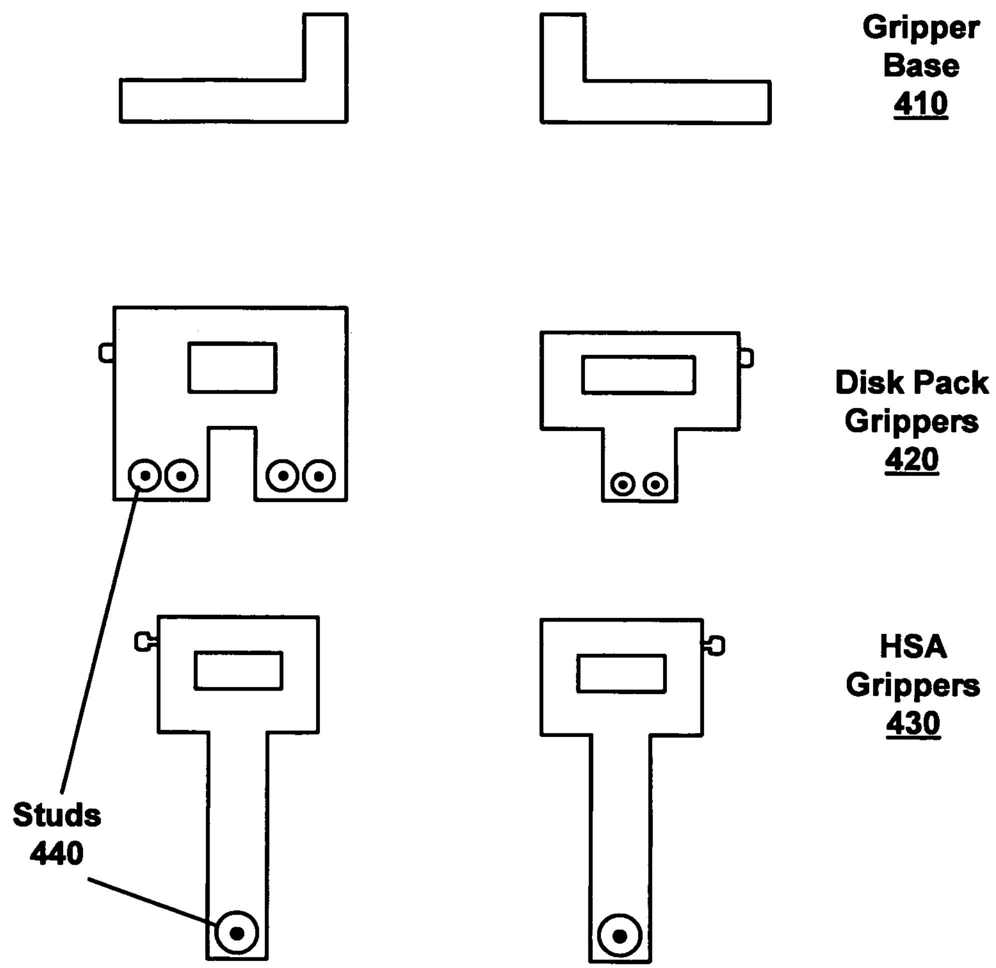
FIGS. 4 and 5 depict various types of grippers 410, 420, 430 that can be used for holding various types of manufactured parts, according to various embodiments.
Figure 5:
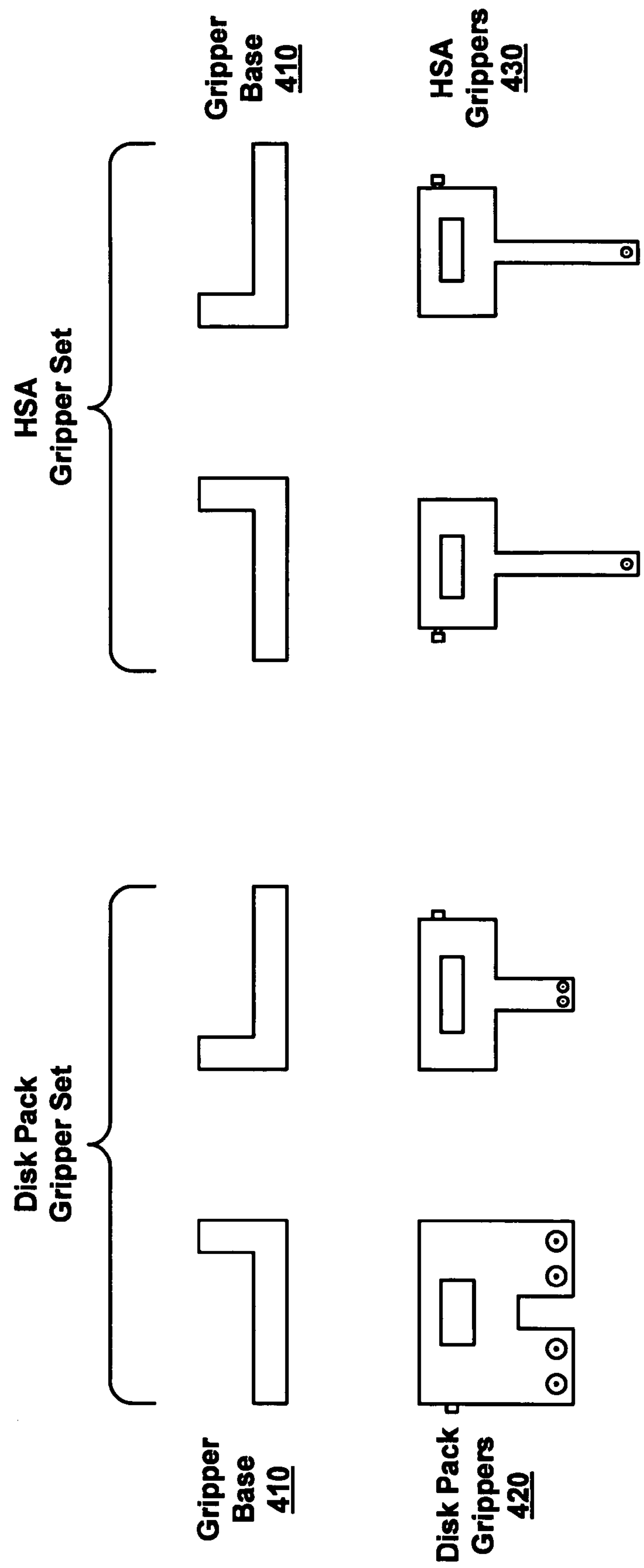
Figure 6:
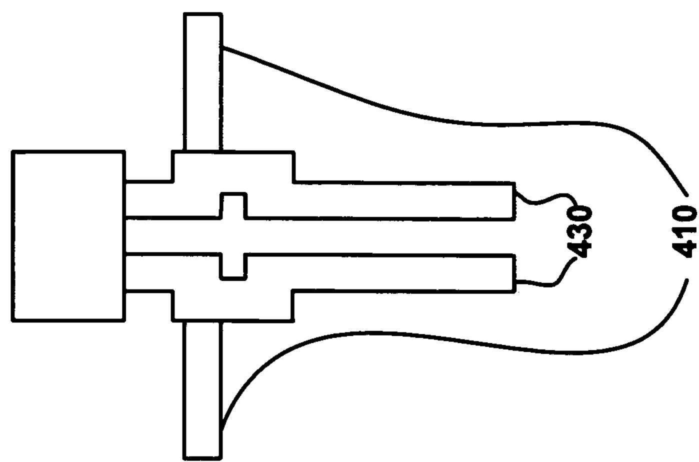
FIG. 6 depicts robotic arms assembled with a gripper base and grippers, according to various embodiments.
Figure 6:
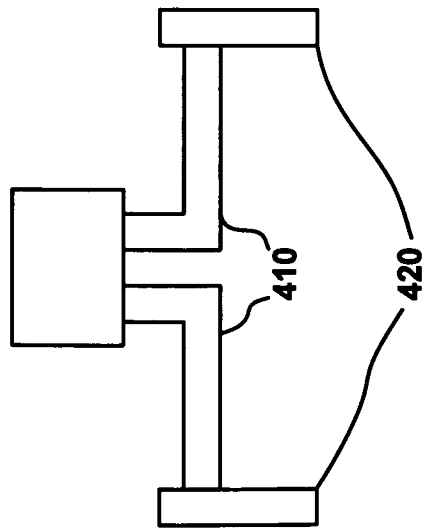
Figure 8:
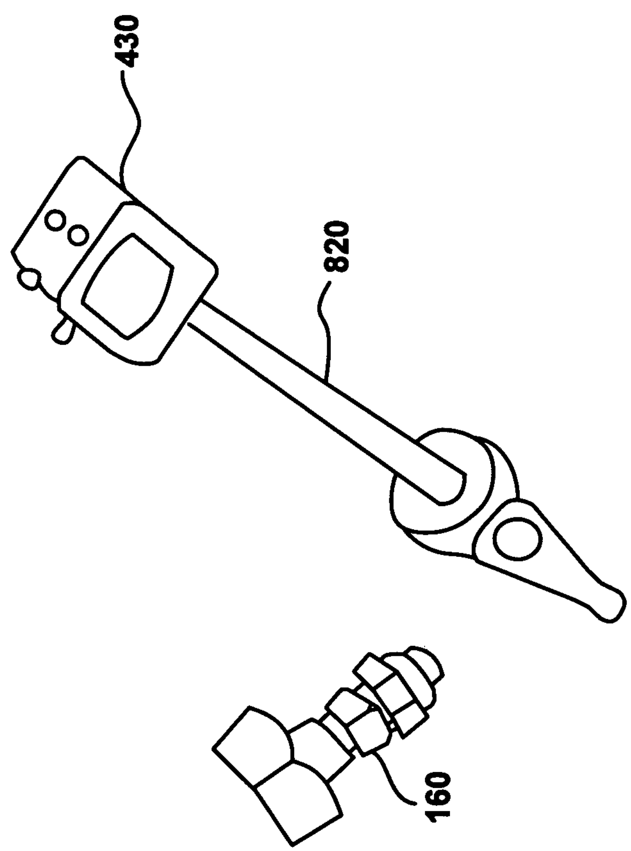
FIG. 8 depicts an HSA gripper gripping an HSA while the HSA is being sprayed, according to one embodiment.
Figure 9:
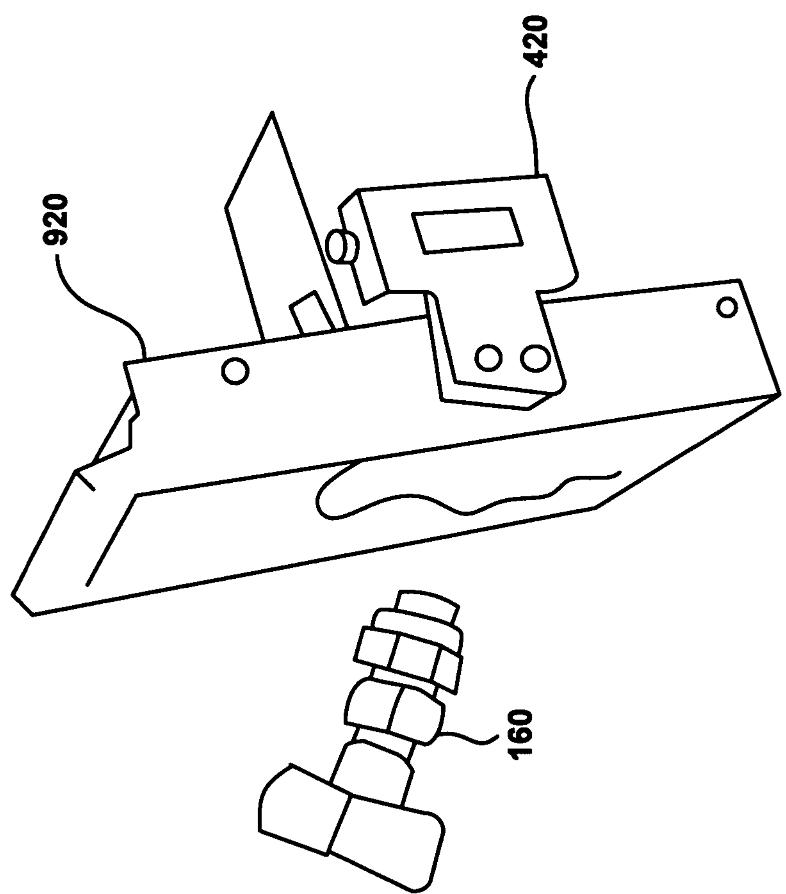
FIG. 9 depicts a disk pack gripper while the disk pack is being sprayed, according to another embodiment.

FIGS. 4 and 5 depict various types of grippers 410, 420, 430 that can be used for holding various types of manufactured parts, according to various embodiments. FIG. 4 depicts a gripper base 410, followed by grippers 420 that can be used for gripping a disk pack, followed by grippers 430 that can be used for gripping an HSA. The grippers 420, 430 are depicted with rubber studs 440. FIG. 5 illustrates a gripper base 410 that would be used with a disk pack gripper set 420 and a gripper base 410 that would be used with an HSA gripper set 430. FIG. 6 depicts robotic arms assembled with a gripper base and grippers, according to various embodiments. On the top, a robotic arm is assembled with a gripper base 410 and a disk pack gripper 420. On the bottom, a robotic arm is assembled with a gripper base 410 and an HSA gripper 430. The gripper design allows for interchanging the grippers 420, 430 quickly and easily with a minimum of handling. The grippers 420 and 430 can slide in and out of the gripper base 410 easily and can be locked into position with screws. FIG. 8 depicts an HSA gripper 430 gripping an HSA 820 while the HSA 820 is being sprayed, according to one embodiment. FIG. 9 depicts a disk pack gripper 420 while the disk pack 920 is being sprayed, according to another embodiment. According to one embodiment, a KOGANEI™ NHBDPA-16-JS-428W-ZE235-A-2 gripper controller is used.

Solution

According to one embodiment, the solution 150 that is used to remove contaminants from a manufactured part 140 by spraying it 140 is clean water. For example, the solution 150 can be water from the manufacturing sites treatment plant. The water is di-ionized to remove ion contaminants. The solution 150 may include 0.004% Micro-90 detergent. The detergent, according to one embodiment, facilitates removal of contaminants from a manufactured part 110.

Pressurized Vessel and Spray Nozzle

According to one embodiment, a system 100, 200 for automatically removing contaminants from a manufactured part 140 can include a pressurized vessel of solution 150. According to one embodiment, a spray nozzle 250017 is used. The spray pressure can range from approximately 10 to 120 PSI (pressure per square inch). According to one embodiment, the solution 150 is maintained in the vessel at approximately 40 PSI (pressure per square inch). At approximately 40 PSI, a spray nozzle 250017 can delivery solution at approximately 65 millimeters/minute. The spray flow rate can range from approximately 20 to 1000 ml/minute. The spray nozzle can be held at a distance that ranges from approximately 5 to 50 mm from the manufactured part 140 it 160 sprays. According to one embodiment, the spray nozzle 160 is held approximately one inch from the manufactured part 140 as it 160 sprays the manufactured part 140. The spray nozzle 160 can spray the manufactured part 140 for approximately 30 seconds to 10 minutes depending on the type of manufactured part 140. For example, more complex manufactured parts may be sprayed for a longer period of time. According to one embodiment, the manufactured part 140 is sprayed from approximately 2 minutes to 3 minutes. According to one embodiment, the spray nozzle 160 includes a filter membrane to further filter the solution 150. However, the filter membrane is not required.

User Interface

According to one embodiment, the system 100, 200 includes one or more user interfaces. A user interface can be used as a part of resuming, resetting, or manually overriding the operations of the system 100, 200 at any point in time. A user interface can also include a main disconnect, a power on, a power off, an emergency stop and an emergency power off. The main disconnect can be a main electrical breaker that is lockable. The power on can be used to activate the electrical systems and the power off can be used to deactivate the electrical systems. The emergency stop can be used to stop operations that are currently being performed leaving the controls on but terminating any spray operation that is currently being performed. The emergency power off can be used to terminate all motion, to de-energize all electrical systems and to stop all operations. According to one embodiment, the user interfaces are outside of the enclosure 210. The user interface, according to one embodiment, can include, among other things, a control panel with buttons for power on, power off, etc. . . . .

Various Specifications

According to one embodiment, the system's enclosure 210 is approximately 700 millimeters (mm) long, 650 mm wide and 600 mm high. According to one embodiment, the pneumatic hose connectors are quick connection types of hose connectors. According to another embodiment, the solenoid valves with adjustable air regulator manifolds are consistent with other existing applications used in the system for automatically removing contaminants. According to yet another embodiment, the pneumatic exhausts are connected to the manufacturing site's air exhaust system.

According to one embodiment, the electrical power supply used with a system for automatically removing contaminants is 110 Vac 50/60 Hz. The solenoids are 24 Vdc. Terminal lugs can be used for all of the 110 V AC power terminations. The tools to control the control box or other module connections can be quick disconnection type. The incoming power can be routed through the main circuit breaker controlled by the emergency power off (EPO). The station components, according to one embodiment, are grounded by ground wires fastened with a star washer for movable components. All parts of the system 100, 200, according to one embodiment, have direct contact with file components or the pallet is grounded.

Various types of materials can be used in a system for automatically removing contaminants. For example, pomalux SD-A can be used in areas where contamination is generated or contact is a concern. 300 series stainless steel and Nickel-plated (using electroless Nickel plating) can also be used in various parts of a system for automatically removing contaminants.

A Disk Drive

Figure 10:
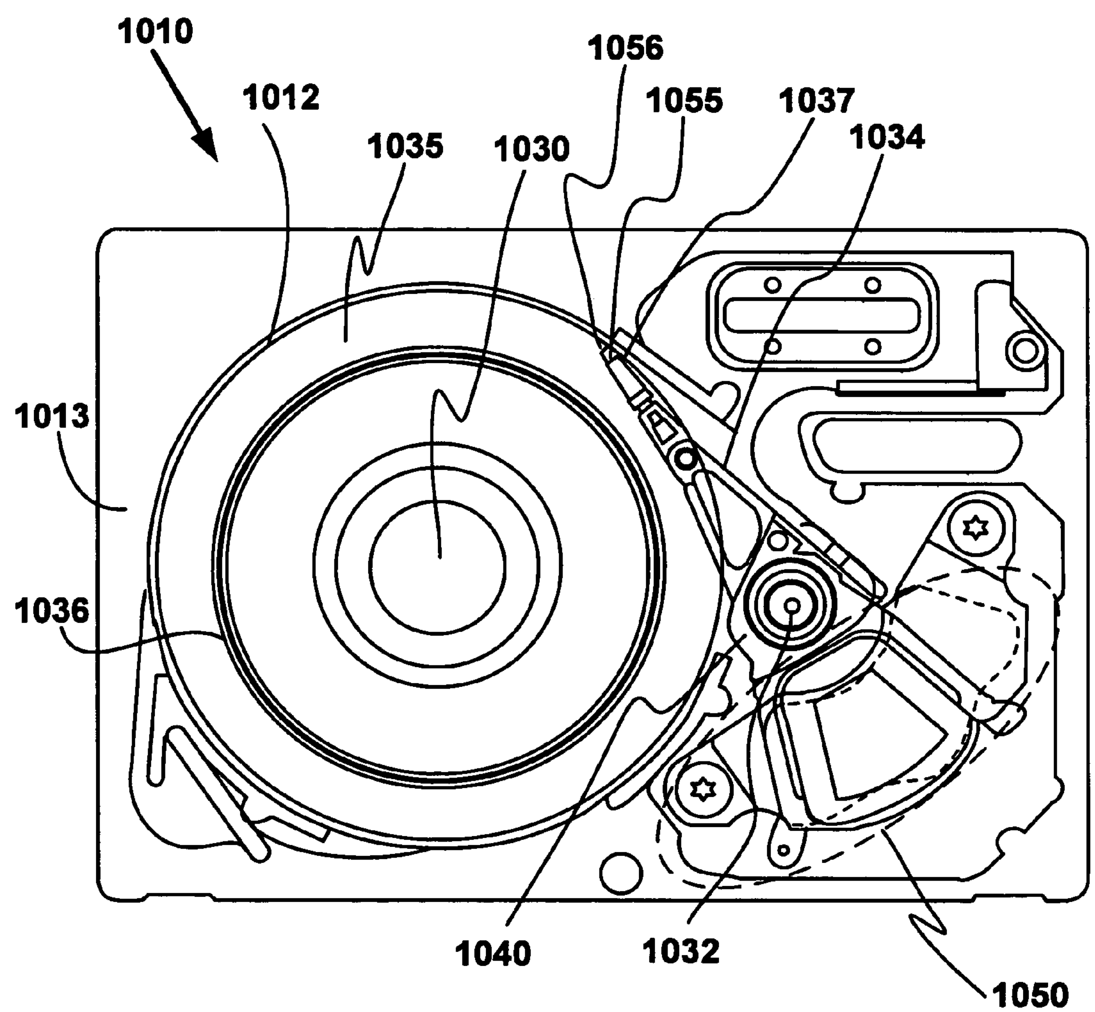
FIG. 10 depicts a plan view of a disk drive for facilitating the discussion of various embodiments of the present invention.

FIG. 10 depicts a plan view of a disk drive for facilitating the discussion of various embodiments of the present invention. The disk drive 1010 includes a base casting 1013, a motor hub assembly 1030, a disk 1012, actuator shaft 1032, actuator arm 1034, suspension assembly 1037, a hub 1040, voice coil motor 1050, a magnetic head 1056, and a slider 1055.

The components are assembled into a base casting 1013, which provides attachment and registration points for components and sub assemblies. A plurality of suspension assemblies 1037 (one shown) can be attached to the actuator arms 1034 (one shown) in the form of a comb. A plurality of transducer heads or sliders 1055 (one shown) can be attached respectively to the suspension assemblies 1037. Sliders 1055 are located proximate to the disk 1012's surface 1035 for reading and writing data with magnetic heads 1056 (one shown). The rotary voice coil motor 1050 rotates actuator arms 1035 about the actuator shaft 1032 in order to move the suspension assemblies 1050 to the desired radial position on a disk 1012. The actuator shaft 1032, hub 1040, actuator arms 1034, and voice coil motor 1050 may be referred to collectively as a rotary actuator assembly.

Data is recorded onto the disk's surface 1035 in a pattern of concentric rings known as data tracks 1036. The disk's surface 1035 is spun at high speed by means of a motor-hub assembly 1030. Data tracks 1036 are recorded onto spinning disk surfaces 1035 by means of magnetic heads 1056, which typically reside at the end of sliders 1055.

FIG. 10 being a plan view shows only one head, slider and disk surface combination. One skilled in the art understands that what is described for one head-disk combination applies to multiple head-disk combinations, such as disk stacks (not shown). However, for purposes of brevity and clarity, FIG. 10 only shows one head and one disk surface. Various parts and subassemblies of a disk drive 1010 can have contaminants removed using various embodiments described herein.

Method of Automatically Removing Contaminants

Figure 11:
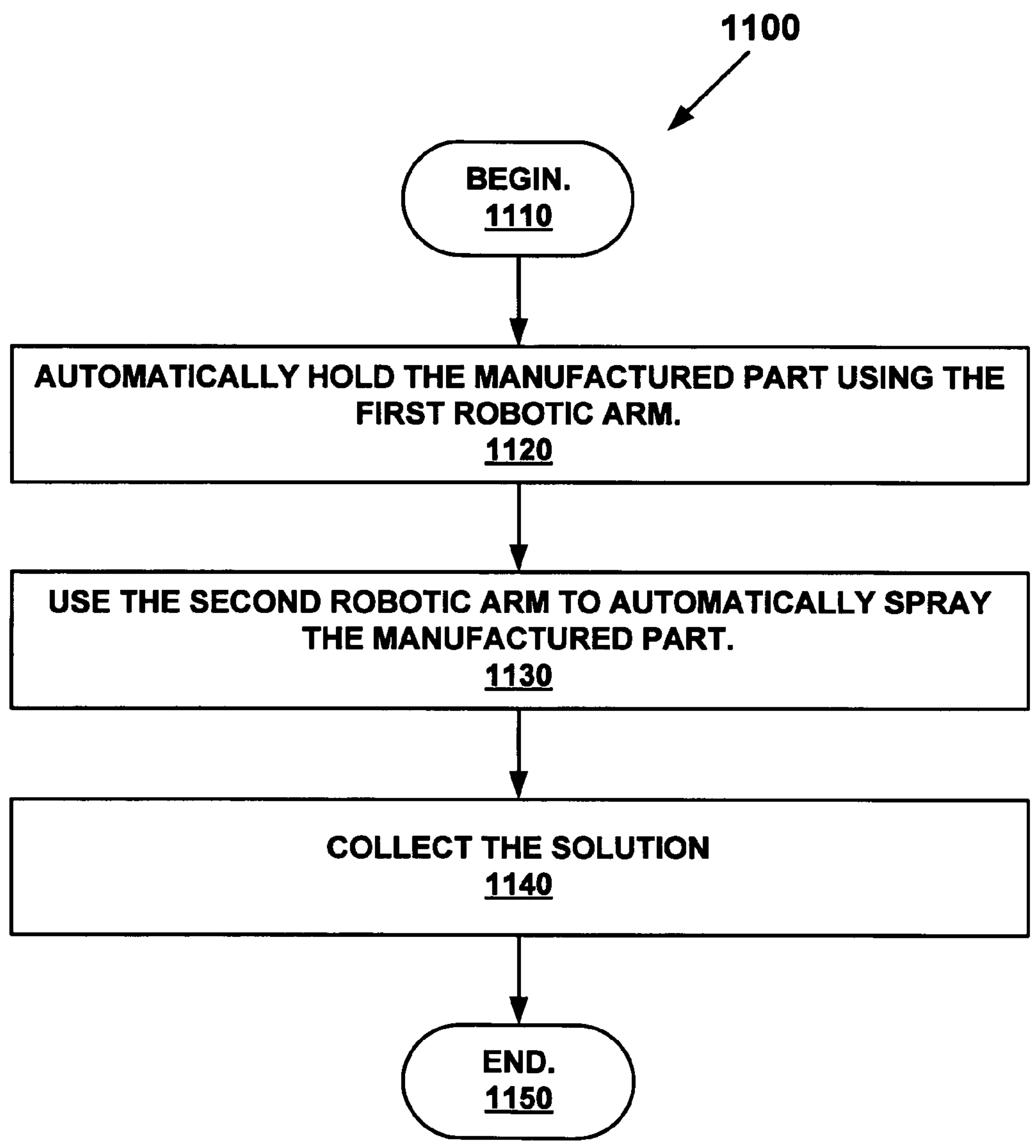
FIG. 11 depicts a flowchart 1100 describing a method for automatically removing contaminants from a manufactured part, according to one embodiment of the present invention.

FIG. 11 depicts a flowchart 1100 describing a method for automatically removing contaminants from a manufactured part, according to one embodiment of the present invention. Although specific steps are disclosed in flowchart 1100, such steps are exemplary. That is, embodiments of the present invention are well suited to performing various other steps or variations of the steps recited in flowchart 1100. It is appreciated that the steps in the flowchart 1100 may be performed in an order different than presented, and that not all of the steps in flowchart 1100 may be performed.

At step 1110, the method begins.

Figure 7:
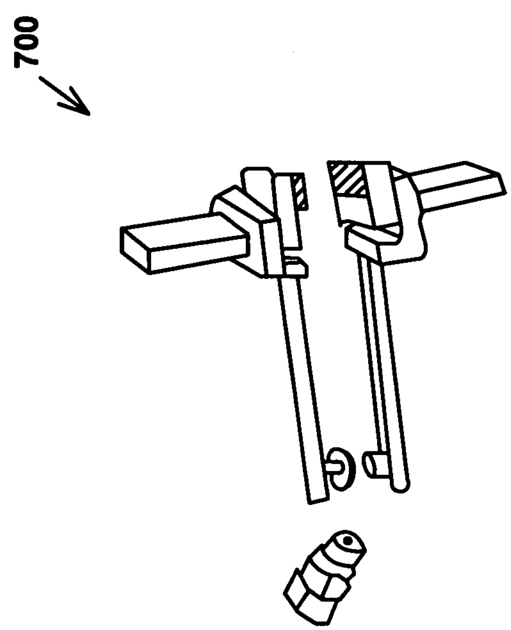
FIG. 7 depicts a gripping being cleaned during a gripper cleaning cycle, according to one embodiment.

At step 1120, the manufactured part is automatically held by a first robotic arm. For example, the "start" button on one of the user interfaces can be pressed to start the method described by flowchart 1100. In preparation of holding a manufactured part 110, one of the robotic arms 110 positions a clean collection component 180 for collecting solution 170 that has been sprayed onto a manufactured part 140 in the "spray zone." The collection component 180 can be 110 mm clean beaker. The second robotic arm 120 can be used to clean the gripper 190 on the first robotic arm 110 by spraying the gripper 190 to avoid cross contamination (also referred to herein as "gripper cleaning cycle"). FIG. 7 depicts a gripping being cleaned during a gripper cleaning cycle, according to one embodiment. According to one embodiment, the gripper cleaning cycle is performed to start between all spray extraction cycles. After the gripper cleaning cycle has been performed, the robotic arms 110, 120 move to a "home" position.

According to one embodiment, a "spray extraction cycle" begins when the "start" button is pushed a second time. The first robotic arm 110 picks up a part 140, which has not been sprayed yet, from the fresh parts tray 310 and positions the manufactured part 140 over the clean beaker 180 in the spray zone. The first robotic arm 110 may hold the manufactured part 140 at an angle in order to maximize the collection of the sprayed solution 170.

According to one embodiment, the program instructions on the controller 130 causes one of the robotic arms 110 to position the collecting component 180 in the spray zone, causes the cleaning cycle to be performed, and causes the spray extraction cycle to be performed, among other things.

At step 1130, a second arm is used to automatically spray the manufactured part with a solution that causes contaminate to be removed from the manufactured part. For example, the second robotic arm 120 is positioned to spray 150 the manufactured part 140. The end of the spray nozzle 160 associated with the second robotic arm 120 is positioned approximately 1 inch or approximately 25 mm away from the manufactured part 140. The second robotic arm 120 sprays 150 the manufactured part 140 that the first robotic arm 110 is holding to remove loose surface contaminants. The distance between the end of the spray nozzle 160 and the manufactured part 160 is maintained while the manufactured part 140 is being sprayed.

At step 1140, the solution is collected. For example, the solution that has been sprayed onto the manufactured part 140 is collected 170 in the clean beaker 180. The collected solution 170 includes the loose surface contaminants that were removed by the spraying of the solution 150 onto the manufactured part 140. The beaker 180 with the collected solution 170 is moved and the manufactured part 140 that was sprayed is placed on the used parts tray 320. According to one embodiment, the clean parts tray 310 and the used parts tray 320 are large enough to hold more than one manufactured part. The process of holding, spraying, etc can be repeated with a new clean beaker and the next manufactured part.

At step 1150, the method ends.

Analysis

Methods and systems for automatically removing contaminants, according to various embodiments pertain to the field of particle analysis of HDD (hard disk drive), HDD subassemblies and HDD components. Various embodiments can be used to extract particles using diluted detergent solution to bombard loose surface particles on the manufactured parts and to flush the solution into a collection component, as described herein. The collected solution can be filtered onto a polycarbonate membrane filter (referred to herein as the "filtered sample") with pore size of 0.2, 0.4, 0.8 um, etc. . . . using a filter device with 2 mm, 3 mm or other spot sizes. The filtered sample can be analyzed using a SEM (such as LEO-1430) with EDX (such as EDAX Phoenix) Microanalysis system using accelerating voltages of 20 kV under magnification of 500×, 1000×, or other magnification that can be used for analyzing the filtered solution. 2 to 5 locations, according to one embodiment, of each filtered sample can be analyzed to ensure a wide coverage of particle distribution. When three locations were analyzed using a prototype of a system for automatically removing contaminants, the particle count was performed on 2 of the 3 locations, and particle count and identification was performed at 1 of the 3 locations. The area analyzed per location equaled (4×3) fields×(0.238×0.178) field size (under 500×) equaled 0.508368 $mm^2$. The total particle count reported was the average of the 3 locations, in other words equal to the average raw data times a factor of 13.9.

CONCLUSION

A system for automatically removing contaminants, according to various embodiments, is easy to use, easy to maintain, operates reliably, and provides repeatable results. For example, a prototype system for automatically removing contaminants, according to various embodiments, was found to have a mean time between failures (MTBF) that was greater than 2000 hours. The mean time to repair (MTTR)

was found to be less than 30 minutes. The yield of the system was found to be 99.5% with a G shock of less than 40 Gs.

MEANS FOR

In one embodiment, a system of automatically removing contaminants from a manufactured part is described, the system comprising: means for controlling holding the manufactured part and for controlling spraying of the manufactured part; means for automatically holding the manufactured part, wherein the means for automatically holding the manufactured part is communicatively coupled to the means for controlling; means for automatically spraying the manufactured part with a solution that causes contaminants to be removed from the manufactured part, wherein the means for automatically spraying the manufactured part is communicatively coupled to the means for controlling and does not come into physical contact with said manufactured part; and moveable means for automatically collecting the solution, wherein the collected solution contains the contaminants removed from the manufactured part.

What is claimed is:

1. A system for automatically removing contaminants from a manufactured part, the system comprising:

a controller for controlling a first robotic arm and a second robotic arm;

said first robotic arm for holding the manufactured part, wherein said first robotic arm is communicatively coupled to the controller;

said second robotic arm for spraying the manufactured part with a solution that causes contaminants to be removed from the manufactured part, wherein said second robotic arm is communicatively coupled to the controller and does not come into physical contact with said manufactured part; and a moveable collection component for collecting the solution, which contains the contaminants removed from the manufactured part.

2. The system of claim 1, wherein the controller executes a computer program that includes computer instructions for controlling said first robotic arm and said second robotic arm.

3. The system of claim 1, wherein said first and second robotic arms have 6 degrees of freedom.

4. The system of claim 1, wherein said first robotic arm includes a gripper for gripping the manufactured part.

5. The system of claim 4, wherein one or more studs are attached to said gripper.

6. The system of claim 5, wherein said one or more studs are non-metallic.

7. The system of claim 4, wherein the gripper is a first type of gripper that can be used for gripping a first type of manufactured part and wherein the gripper can be changed to a second type of gripper for gripping another type of manufactured part.

8. The system of claim 1, further comprising a spray nozzle that is attached to said second robotic arm, wherein the spray nozzle is used to spray the manufactured part.

9. The system of claim 8, further comprising a pressurized vessel for delivering the solution through the spray nozzle.

10. The system of claim 9, wherein the solution in said pressurized vessel is maintained at a range of approximately 10 to 120 pounds per square inch (PSI).

11. A system of automatically removing contaminants from a manufactured part, the system comprising:

means for controlling holding the manufactured part and for controlling spraying of the manufactured part;

means for automatically holding the manufactured part, wherein the means for automatically holding the manufactured part is communicatively coupled to the means for controlling;

means for automatically spraying the manufactured part with a solution that causes contaminants to be removed from the manufactured part, wherein the means for automatically spraying the manufactured part is communicatively coupled to the means for controlling and does not come into physical contact with said manufactured part; and moveable means for automatically collecting the solution, wherein the collected solution contains the contaminants removed from the manufactured part.

12. The system of claim 11, wherein the solution is clean di-ionized water that includes detergent.

13. The system of claim 11, further comprising an enclosure for the means for automatically holding and the means for automatically spraying.

* * * * *